(12) United States Patent
Nemat-Nasser et al.

(10) Patent No.: US 8,744,642 B2
(45) Date of Patent: Jun. 3, 2014

(54) DRIVER IDENTIFICATION BASED ON FACE DATA

(75) Inventors: Syrus C. Nemat-Nasser, San Diego, CA (US); Andrew Tombras Smith, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 131 days.

(21) Appl. No.: 13/235,263

(22) Filed: Sep. 16, 2011

(65) Prior Publication Data

US 2013/0073114 A1    Mar. 21, 2013

(51) Int. Cl.
| | | |
|---|---|---|
| *G05D 1/00* | (2006.01) | |
| *B60W 40/09* | (2012.01) | |
| *B60W 40/08* | (2012.01) | |
| *B60T 17/18* | (2006.01) | |
| *B60W 30/00* | (2006.01) | |
| *B60K 28/02* | (2006.01) | |

(52) U.S. Cl.
CPC ............... *B60W 40/09* (2013.01); *B60W 40/08* (2013.01); *B60T 17/18* (2013.01); *B60W 30/00* (2013.01); *B60K 28/02* (2013.01)
USPC ............... 701/1; 701/29.6; 701/33.4; 701/45; 340/439

(58) Field of Classification Search
CPC ........ A61B 5/18; B60T 17/18; B60K 28/066; B60K 28/02; B60W 30/00; B60W 40/09; G06K 9/00845
USPC .......... 701/1, 29.1, 29.6, 33.4, 33.6, 34.3, 35, 701/36, 45; 340/425.5, 438, 439
See application file for complete search history.

(56) References Cited

U.S. PATENT DOCUMENTS

| | | |
|---|---|---|
| 4,281,354 A | 7/1981 | Conte |
| 4,718,685 A | 1/1988 | Kawabe et al. |
| 5,140,436 A | 8/1992 | Blessinger |
| 5,497,419 A | 3/1996 | Hill |
| 5,546,191 A | 8/1996 | Hibi et al. |
| 5,600,775 A | 2/1997 | King et al. |
| 5,689,442 A | 11/1997 | Swanson et al. |
| 5,815,093 A | 9/1998 | Kikinis |
| 5,825,284 A | 10/1998 | Dunwoody et al. |
| 6,141,611 A | 10/2000 | Makey et al. |
| 6,163,338 A | 12/2000 | Johnson et al. |

(Continued)

FOREIGN PATENT DOCUMENTS

| | | |
|---|---|---|
| DE | 4416991 | 11/1995 |
| EP | 1818873 | 8/2007 |

OTHER PUBLICATIONS

David Cullen, "Getting a real eyeful", Fleet Owner Magazine, Feb. 2002.
Ronnie Rittenberry, "Eyes on the Road", Jul. 2004.

(Continued)

*Primary Examiner* — Gertrude Arthur Jeanglaud
(74) *Attorney, Agent, or Firm* — Van Pelt, Yi & James LLP (57) ABSTRACT

A system for identifying a driver comprises an image capturing device, a processor, and a memory. The image is captured during vehicle operation and of an expected driver location. The processor is configured to detect a face of a driver in the image, determine a set of face data from the image, and identify the driver based at least in part on the set of face data. The memory is coupled to the processor and configured to provide the processor with instructions.

20 Claims, 9 Drawing Sheets

(56) References Cited

U.S. PATENT DOCUMENTS

| | | | |
|---|---|---|---|
| 6,389,340 B1 | 5/2002 | Rayner | |
| 6,405,132 B1 | 6/2002 | Breed et al. | |
| 6,449,540 B1 | 9/2002 | Rayner | |
| 6,575,902 B1 | 6/2003 | Burton | |
| 6,718,239 B2 | 4/2004 | Rayner | |
| 7,098,812 B2 | 8/2006 | Hirota | |
| 7,209,833 B2 | 4/2007 | Isaji et al. | |
| 7,702,442 B2 | 4/2010 | Takenaka | |
| 7,821,421 B2 | 10/2010 | Tamir et al. | |
| 2001/0005804 A1 | 6/2001 | Rayner | |
| 2002/0111725 A1 | 8/2002 | Burge | |
| 2002/0163532 A1 | 11/2002 | Thomas et al. | |
| 2003/0080878 A1 | 5/2003 | Kirmuss | |
| 2004/0039503 A1 | 2/2004 | Doyle | |
| 2004/0103010 A1 | 5/2004 | Wahlbin et al. | |
| 2004/0236474 A1 | 11/2004 | Chowdary et al. | |
| 2005/0073585 A1 | 4/2005 | Ettinger et al. | |
| 2005/0166258 A1 | 7/2005 | Vasilevsky et al. | |
| 2006/0011399 A1* | 1/2006 | Brockway et al. | 180/272 |
| 2006/0053038 A1 | 3/2006 | Warren et al. | |
| 2006/0072792 A1 | 4/2006 | Toda et al. | |
| 2006/0103127 A1 | 5/2006 | Lie et al. | |
| 2006/0212195 A1 | 9/2006 | Veith et al. | |
| 2006/0253307 A1 | 11/2006 | Warren et al. | |
| 2007/0001831 A1 | 1/2007 | Raz et al. | |
| 2007/0027726 A1 | 2/2007 | Warren et al. | |
| 2007/0120948 A1 | 5/2007 | Fujioka et al. | |
| 2007/0124332 A1 | 5/2007 | Ballesty et al. | |
| 2007/0135979 A1 | 6/2007 | Plante | |
| 2007/0136078 A1 | 6/2007 | Plante | |
| 2007/0150140 A1 | 6/2007 | Seymour | |
| 2007/0173994 A1 | 7/2007 | Kubo et al. | |
| 2007/0183635 A1 | 8/2007 | Weidhass | |
| 2007/0216521 A1 | 9/2007 | Guensler et al. | |
| 2007/0241874 A1 | 10/2007 | Okpysh et al. | |
| 2007/0257781 A1 | 11/2007 | Denson | |
| 2007/0257804 A1 | 11/2007 | Gunderson et al. | |
| 2007/0257815 A1 | 11/2007 | Gunerson et al. | |
| 2007/0260677 A1 | 11/2007 | DeMarco et al. | |
| 2007/0268158 A1 | 11/2007 | Gunderson et al. | |
| 2007/0271105 A1 | 11/2007 | Gunderson et al. | |
| 2007/0299612 A1 | 12/2007 | Kimura et al. | |
| 2008/0157510 A1* | 7/2008 | Breed et al. | 280/735 |
| 2008/0167775 A1 | 7/2008 | Kuttenberger et al. | |
| 2008/0269978 A1 | 10/2008 | Shirole | |
| 2009/0224869 A1 | 9/2009 | Baker et al. | |
| 2010/0063672 A1 | 3/2010 | Anderson | |
| 2010/0070175 A1 | 3/2010 | Soulchin et al. | |
| 2010/0085193 A1 | 4/2010 | Boss et al. | |
| 2010/0087984 A1 | 4/2010 | Joseph | |
| 2010/0220892 A1 | 9/2010 | Kawakubo | |
| 2011/0043624 A1* | 2/2011 | Haug | 348/135 |
| 2011/0091079 A1 | 4/2011 | Yu-Song et al. | |
| 2011/0121960 A1 | 5/2011 | Tsai | |
| 2011/0125365 A1 | 5/2011 | Larschan et al. | |
| 2012/0046803 A1* | 2/2012 | Inou et al. | 701/1 |

OTHER PUBLICATIONS

"HindSight v4.0 Users Guide", DriveCam Video Systems, Apr. 25, 2005.
Glenn Oster, "HindSight 20/20 v4.0 Software Installation", 1 of 2, Jun. 20, 2003.
Glenn Oster, "HindSight 20/20 v4.0 Software Installation", 2 of 2, Jun. 20, 2003.
DriveCam Extrinsic Evidence with Patent LR 4.1.a Disclosures, Nov. 8, 2011.
"DriveCam, Inc's Disclosure of Proposed Constructions and Extrinsic Evidence Pursuant to Patent L.R. 4.1.a & 4.1.b" in *DriveCam, Inc. v. SmartDrive Systems, Inc.*, Case No. 3:11-CV-00997-H-RBB, for the Southern District of California. Nov. 8, 2011.
"Preliminary Claim Construction and Identification of Extrinsic Evidence of Defendant/Counterclaimant SmartDriveSystems, Inc." in *DriveCam, Inc. v. SmartDrive Systems, Inc.*, Case No. 3:11-CV-00997-H (RBB), for the Southern District of California. Nov. 8, 2011.
"DriveCam, Inc's Disclosure of Responsive Constructions and Extrinsic Evidence Pursuant to Patent L.R. 4.1.c & 4.1d" in DriveCam, Inc. v. SmartDrive Systems, Inc., Case No. 3:11-CV-00997-H-RBB, for the Southern District of California. Nov. 15, 2011.
"Responsive Claim Construction and Identification of Extrinsic Evidence of Defendant/Counterclaimant SmartDrive Systems, Inc." in *DriveCam, Inc. v. SmartDrive Systems, Inc.*, Case No. 3:11-CV-00997-H (RBB), for the Southern District of California. Nov. 15, 2011.
"Joint Claim Construction Chart" in *DriveCam, Inc. v. SmartDrive Systems, Inc.*, Case No. 11-CV-0997-H (RBB), for the Southern District of California, Document 43, filed Dec. 1, 2011, pp. 1-2.
Joint Claim Construction Chart, U.S. Patent No. 6,389,340, "Vehicle Data Recorder" for Case No. 3:11-CV-00997-H-RBB, Document 43-1, filed Dec. 1, 2011, pp. 1-33.
"Joint Claim Construction Worksheet" in *DriveCam, Inc. v. SmartDrive Systems, Inc.*, Case No. 3:11-CV-00997 H (RBB), for the Southern District of California, Document 44, filed Dec. 1, 2011, pp. 1-2.
Joint Claim Construction Worksheet, U.S. Patent No. 6,389,340, "Vehicle Data Reporter" for Case No. 3:11-CV-00997-H-RBB, Document 44-1, filed Dec. 1, 2011, pp. 1-10.
"Answer to Amended Complaint; Counterclaims; and Demand for Jury Trial" in *DriveCam, Inc. v. SmartDrive Systems, Inc.*, Case No. 3:11-CV-00997 H (RBB), for the Southern District of California, Document 47, filed Dec. 13, 2011, pp. 1-15.
"First Amended Answer to Amended Complaint and First Amended Counterclaims; and Demand for Jury Trial" in *DriveCam, Inc. v. SmartDrive Systems, Inc.*, Case No. 3:11-CV-00997 H (RBB), for the Southern District of California, Document 53, filed Dec. 20, 2011, pp. 1-48.
"First Amended Answer to Amended Complaint and First Amended Counterclaims; and Demand for Jury Trial" in *DriveCam, Inc. v. SmartDrive Systems, Inc.*, Case No. 3:11-CV-00997 H (RBB), for the Southern District of California, Document 55, filed Jan. 3, 2012, pp. 86-103.
DriveCam, User's Manual for DriveCam Video Systems', HindSight 20/20 Software Version 4.0, S002751-S002804(2003).
SmartDrives Systems, Inc.'s Production, S014246-S014255, Nov. 16, 2011.
"Supplement to DriveCam's Disclosure of Asserted Claims and Preliminary Infringement Contentions" in *DriveCam, Inc. v. SmartDrive Systems, Inc.*, Case No. 3:11-CV-00997-H-RBB, for the Southern District of California. Oct. 14, 2011.
"DriveCam's Disclosure of Asserted Claims and Preliminary Infringement Contentions" in *DriveCam, Inc. v. SmartDrive Systems, Inc.*, Case No. 3:11-CV-00997-H-RBB, for the Southern District of California. Aug. 19, 2011.
DriveCam, Inc.'s Infringement Contentions Exhibit A, U.S. Patent 6,389,340. Aug. 11, 2011.
DriveCam, Inc.'s Infringement Contentions Exhibit B, U.S. Patent 7,659,827. Aug. 19, 2011.
DriveCam, Inc.'s Infringement Contentions Exhibit C, U.S. Patent 7,804,426. Aug. 19, 2011.
U.S. Appl. No. 11/297,669, filed Dec. 8, 2005, File History.
"Amended Complaint for Patent Infringement, Trade Secret Misappropriation, Unfair Competition and Conversion" in *DriveCam, Inc. v. SmartDrive Systems, Inc.*, Case No. 3:11-CV-00997-H-RBB, for the Southern District of California, Document 34, filed Oct. 20, 2011, pp. 1-15.
U.S. Appl. No. 11/296,906, filed Dec. 8, 2005, File History.
U.S. Appl. No. 11/298,069, filed Dec. 9, 2005, File History.
U.S. Appl. No. 11/299,028, filed Dec. 9, 2005, File History.
U.S. Appl. No. 11/593,659, filed Nov. 7, 2006, File History.
U.S. Appl. No. 11/593,682, filed Nov. 7, 2006, File History.
U.S. Appl. No. 11/595,015, filed Nov. 9, 2006, File History.
U.S. Appl. No. 11/637,754, filed Dec. 13, 2006, File History.
U.S. Appl. No. 11/637,755, filed Dec. 13, 2006, File History.
Drivecam, Inc., User's Manual for Drivecam Video Systems' Hindsight 20/20 Software Version 4.0 (2003).

(56) References Cited

OTHER PUBLICATIONS

Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001.
Panasonic Corporation, Video Cassette Recorder (VCR) Operating Instructions for Models No. PV-V4020/PV-V4520 (1998) (Exhibit 8) (hereinafter "Panasonic").
JVC Company of America, JVC Video Cassette Recorder HR-IP820U Instructions (1996).
Hans Fantel, Video; Search Methods Make a Difference in Picking VCR's, NY Times, Aug. 13, 1989.
Dan Carr, Flash Video template: Video Presentation with Navigation, Jan. 16, 2006.
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY&Category_Code=coaching)., printed from site on Jan. 11, 2012.
GE published its VCR User's Guide for Model VG4255 in 1995.
Adaptec published and sold its VideoOh! DVD software USB 2.0 Edition in at least Jan. 24, 2003.
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012.
David Vogeleer et al., Macromedia Flash Professional 8UNLEASHED (Sams Oct. 12, 2005) in Nov. 2005.
Jean (DriveCam vendor), "DriveCam brochure", Nov. 6, 2002.
"The DriveCam", Nov. 6, 2002.
Jean (DriveCam vendor), "Dc Data Sheet", Nov. 6, 2002.
"Driver Feedback System", Jun. 12, 2001.
Jean (DriveCam vendor), "Feedback Data Sheet", Nov. 6, 2002.
"Interior Camera Data Sheet", Oct. 26, 2001.
Jean (DriveCam vendor), "HindSight 20-20 Data Sheet", Nov. 4, 2002.
"DriveCam Driving Feedback System", Mar. 15, 2004.
Chris Woodyard, "Shuttles save with DriveCam", Dec. 9, 2003.
Julie Stevens, "DriveCam Services", Nov. 15, 2004.
Julie Stevens, "Program Support Roll-Out & Monitoring", Jul. 13, 2004.
Jessyca Wallace, "The DriveCam Driver Feedback System", Apr. 6, 2004.
Karen, "Managers Guide to the DriveCam Driving Feedback System", Jul. 30, 2002.
Del Lisk, "DriveCam Training Handout Ver4", Feb. 3, 2005.
Jessyca Wallace, "Overview of the DriveCam Program", Dec. 15, 2005.
"DriveCam—Illuminator Data Sheet", Oct. 2, 2004.
Karen, "Downloading Options to HindSight 20/20", Aug. 6, 2002.
Bill, "DriveCam—FAQ", Dec. 12, 2003.
David Maher, "DriveCam Brochure Folder", Jun. 6, 2005.
"Passenger Transportation Mode Brochure", May 2, 2005.
Quinn Maughan, "DriveCam Unit Installation", Jul. 21, 2005.
Glenn Oster, "Illuminator Installation", Oct. 3, 2004.
Quinn Maughan, "HindSight Installation Guide", Sep. 29, 2005.
Quinn Maughan, "HindSight Users Guide", Jun. 20, 2005.
"Ambulance Companies Use Video Technology to Improve Driving Behavior", Ambulance Industry Journal, Spring 2003.
Lisa McKenna, "A Fly on the Windshield?", Pest Control Technology Magazine, Apr. 2003.
Quinn Maughan, "Enterprise Services", Apr. 17, 2006.
Quinn Maughan, "DriveCam Enterprise Services", Jan. 5, 2006.
Quinn Maughan, "DriveCam Managed Services", Jan. 5, 2006.
Quinn Maughan, "DriveCam Standard Edition", Jan. 5, 2006.
Kathy Latus (Latus Design), "Case Study—Time Warner Cable", Sep. 23, 2005.
Kathy Latus (Latus Design), "Case Study—Cloud 9 Shuttle", Sep. 23, 2005.
Kathy Latus (Latus Design), "Case Study—Lloyd Pest Control", Jul. 19, 2005.
Bill Siuru, "DriveCam Could Save You Big Bucks", Land Line Magazine, May-Jun. 2000.
J. Gallagher, "Lancer Recommends Tech Tool", Insurance and Technology Magazine, Feb. 2002.
Jessyca Wallace, "Analyzing and Processing DriveCam Recorded Events", Oct. 6, 2003.
PCT/US2010/022012, Invitation to Pay Additional Fees with Communication of Partial International Search, Jul. 21, 2010.
World News Tonight, CBS Television New Program discussing teen drivers using the DriveCam Program and DriveCam Technology, Oct. 10, 2005, On PC formatted CD-R, World News Tonight.wmv, 7.02 MB, Created Jan. 12, 2011.
"World News Tonight", PBS Television New Program discussing teen drivers using the DriveCam Program and DriveCam Technology, Oct. 10, 2005, On PC formatted CD-R, Teens Behind the Wheel. wmv, 236 MB, Created Jan. 12, 2011.

\* cited by examiner

DRIVER IDENTIFICATION BASED ON FACE DATA

BACKGROUND OF THE INVENTION

There is a need in fleet management to accurately determine a driver's performance. Performance information can be used to properly reward safe driving behavior, provide helpful feedback to a driver for future improvement, and fairly assess insurance. Currently, driver performance is evaluated by monitoring driving data such as driver behavior and vehicle operation through a variety of sensors placed onboard vehicles. Driving events captured via the onboard sensors are scored to provide a measurement of driver performance. In a large fleet, a driver is typically not permanently assigned to a particular vehicle, but rather is assigned to a vehicle based on availability. This creates a challenge in assigning captured driving data (e.g., captured driving event data from vehicle operation) to the proper driver in order to evaluate that specific driver's performance. Although driver badges (e.g., a Radio Frequency Identification Device (RFID) badge), are sometimes used to match a driver to driving data, badges have not been reliable because drivers do not consistently carry their badges. Because of this, driving data are often manually assigned to drivers by human operators. In some cases, the manual assignment has led to an unacceptable number of incorrect matches between driving data and driver.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for identifying a driver is disclosed. The system comprises an image capturing device, a processor, and a memory. The image is captured during vehicle operation and of an expected driver location. The processor is configured to detect a face of a driver in the image, determine a set of face data from the image, and identify the driver based at least in part on the set of face data. The memory is coupled to the processor and configured to provide the processor with instructions.

In some embodiments, a driver identification system captures an image of a driver in an expected location of a vehicle. The image is analyzed to locate a face in the image and extract facial features for processing into a set of face data (e.g., geometric relations between the facial feature—for example, eyes, eye brows, nose, mouth, chin, hair, ears, etc.). The face data are analyzed to identify the driver and associate the driver with captured event data stored or transferred during driving. Face data can be transmitted to a remote server for driver identification. Face data can be used to identify the driver by comparing to face data stored in a database or by employing a model of faces. The face data extracted from a single image of a face is smaller than an image of that face, and so the transmission of face data as opposed to image data is more efficient for the communication between a mobile unit and a remote server.

Figure 1:
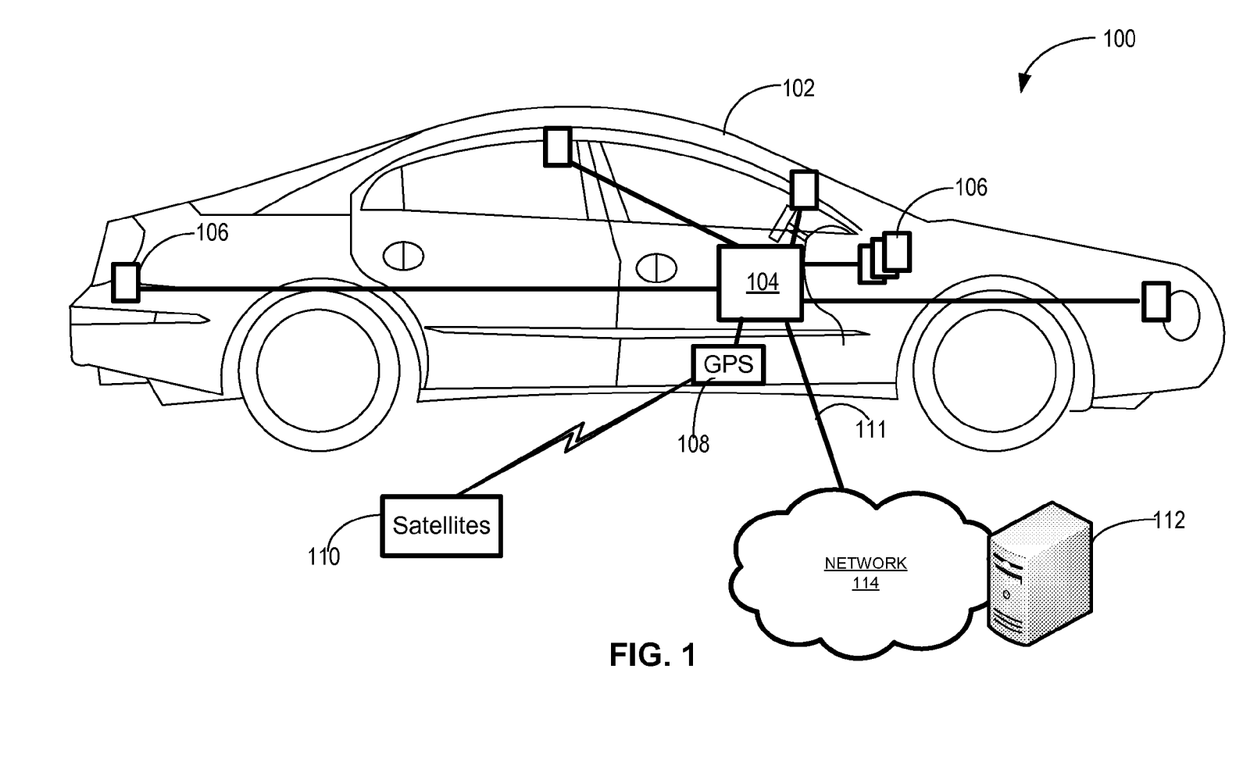
FIG. 1 is a block diagram illustrating an embodiment of a system for identifying a driver.

FIG. 1 is a block diagram illustrating an embodiment of a system for identifying a driver. In the example shown, vehicle 102 is equipped with onboard computer 104 that interfaces with various onboard vehicle sensors 106. Onboard computer 104 includes one or more processors that are capable of executing computer instructions for carrying out various functions involved in assessing driver performance. Onboard computer 104 further includes one or more data storage units for storing computer instructions, rules, algorithms, driving data, various databases and maps such as a digital safety map. Onboard computer 104 further includes one or more communication interfaces for communicating with onboard sensors 106 (e.g., global positioning system (GPS) receiver 108) and remote server 112 sitting on a network 114. In various embodiments, communication interfaces comprise interfaces for wired and/or wireless (short range or long range) links, direct and/or indirect communication links—For example, a universal serial bus interface, a vehicle bus interface (e.g., onboard diagnostic system (OBD)), a global positioning system (GPS) interface, a Bluetooth™ interface, a ZigBee™ link, an institute of electrical and electronics engineers (IEEE) 802.11 point-to-point link, wire/wireless data network link, or any other appropriate interfaces. In various embodiments, network 114 comprises a wired or a wireless phone network, a local area network (LAN), wide area network (WAN), or any other appropriate network.

In various embodiments, one or more onboard sensors 106 comprise an image capturing device (e.g., a video camera, a still camera, etc.), a geo-location data receiver (e.g., GPS 108), a sensor for detecting vehicle operation state, or any other appropriate sensors. In the example shown, GPS 108 receives signals from satellites 110 that provide GPS 108 to provide geo-location data. In some embodiments, one or more onboard sensors 106 (e.g., GPS receiver, accelerometer, etc.) are incorporated into onboard computer 104. In some embodiments, one or more onboard sensors 106 are separate from onboard computer 104. One or more onboard sensors 106 detect various driving data during vehicle operation, including driver behavior, vehicle operation state, and/or various driving conditions or environmental parameters. In various embodiments, driving conditions include road conditions, weather conditions, traffic conditions, or any other appropriate driving conditions. In various embodiments, circuitries, processors and/or communications interfaces are included in one or more sensors for carrying out various functions such as capturing, storing, processing, and/or transmitting sensor data. For example, sensor on/off circuitry is included to turn on/off the sensor, data capture circuitry is included to capture sensor data, and a communications interface circuitry is included to transmit sensor data to a remote server. In some embodiments, these sensor functions are performed automatically by the sensor or are carried out in response to commands (e.g., issued by the onboard computer 104). In various embodiments, one or more data storage units are included in or associated with one or more sensors 106 for storing computer instructions and sensor data. The data storage units include internal or external, fixed or removable, persistent and/or volatile memory. Onboard computer 104 is configured to receive sensor data from one or more sensors and receive other information from other external source(s) (e.g., weather information, road map, etc.) via communications interfaces. For example, still or moving images from various viewing perspectives, speed, acceleration and direction of the vehicle, the geo-location of the vehicle, environmental temperature and moisture level are received from various onboard sensors. In some embodiments, the received sensor data are analyzed to assess driver performance. In some embodiments, the data from different sensors are correlated to time and geo-location of the moving vehicle.

In some embodiments, onboard computer 104 is configured to perform analyses of the detected driving data. In some embodiments, since the computation capacity of the onboard computer 104 is limited, onboard computer 104 performs preliminary analyses and less robust or complex analyses than those performed on remote server 112 that has more computational power. In some embodiments, onboard computer 104 is configured to upload the driving data (e.g., sensor data and/or analysis data) to remote server 112 for further analysis, processing, and/or storage. In some embodiments, uploading driving data is carried automatically by onboard computer 104 based on predefined criteria or upon request (e.g., by remote server 112). In some embodiments, remote server 112 performs more detailed and/or additional analysis of the driving data. For example, the server uses the driving data to identify the driver, analyze driving data, determine driver performance, such as determine driver attitude (e.g., recklessness) and skill, calculate driver risk score, generate driver profile, identify dangerous and erratic driving behavior, identify driver deviation from his/her normal driving behavior (by comparing with his/her driving profile), identify high risk drivers, perform risk analysis for a group of drivers or for an entire fleet, calculate insurance, and/or generate various reports.

Figure 2:
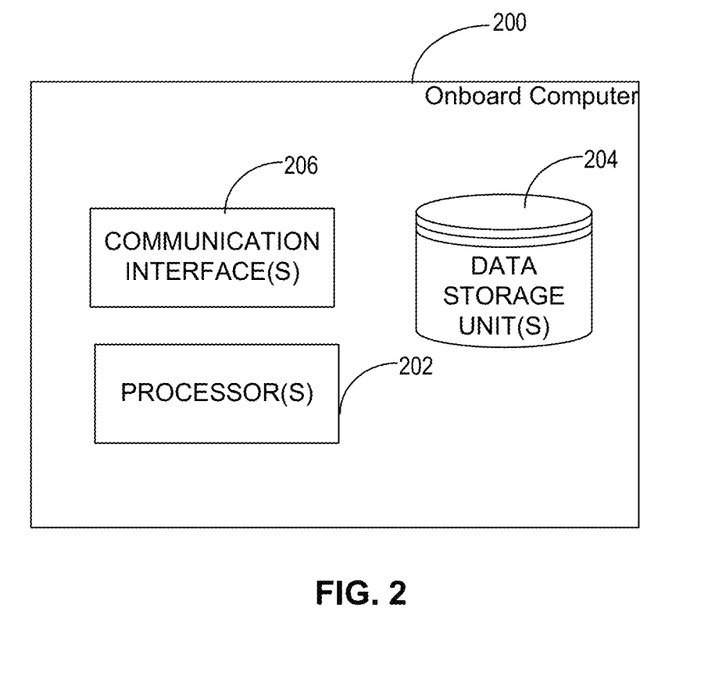
FIG. 2 is a block diagram illustrating an embodiment of an onboard computer.

FIG. 2 is a block diagram illustrating an embodiment of an onboard computer. In the example shown, onboard computer 200 comprises one or more processor(s) 202, communication interface(s) 206, and data storage unit(s) 204.

Figure 3:
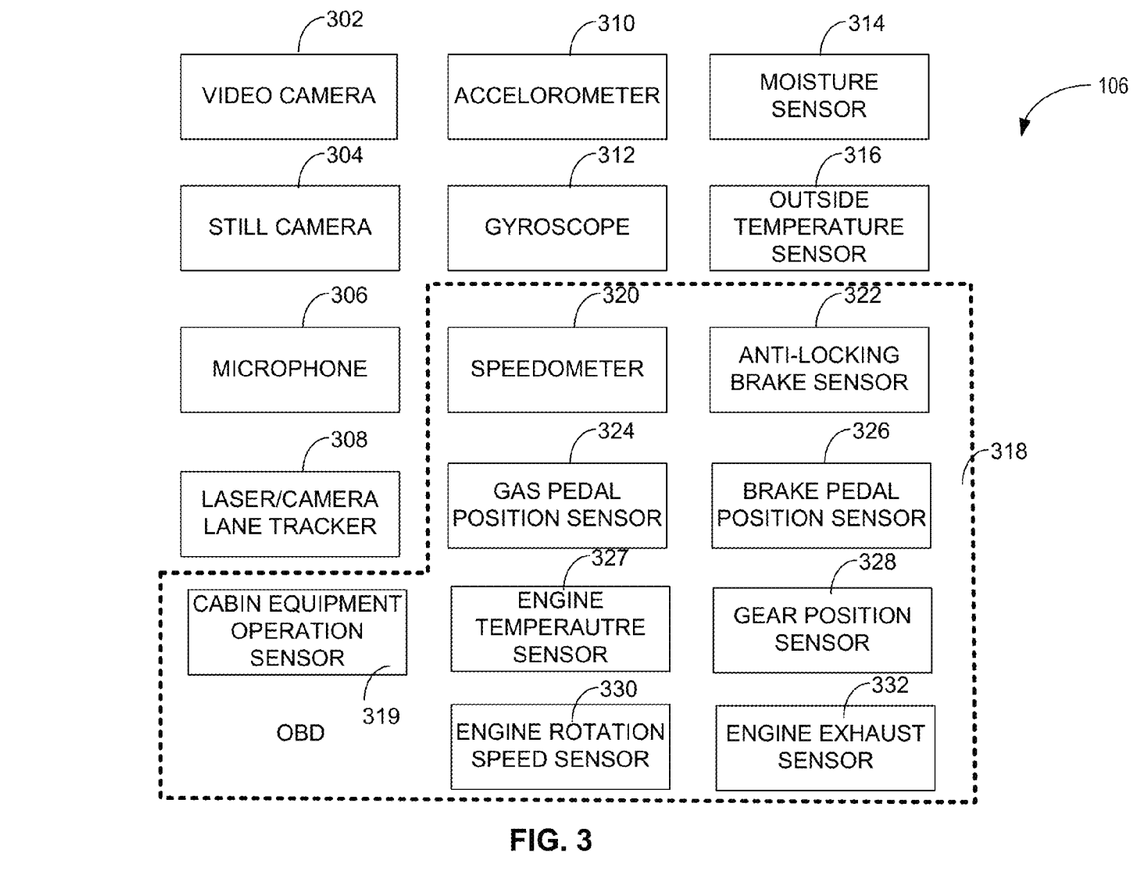
FIG. 3 is a block diagram illustrating the various onboard sensors for detecting driving data in accordance with various embodiments.

FIG. 3 is a block diagram illustrating an embodiment of onboard sensors. In the example shown, one or more video cameras 302 and/or still cameras 304 may be mounted at various positions on the vehicle to capture a cabin view, an exterior view such as a front view, a rear view, a left side view, and/or a right side view. The video cameras and the still cameras may be equipped with infrared emitters for improved night vision and/or for imaging driver facial features through dark sun glasses. The video cameras and/or the still cameras may be stereo video cameras and/or still cameras that are capable of capturing 3-D images. The captured images may be used to identify the driver, to record driver behavior regarding circumstances leading up to, during, and immediately after a driving event. The captured images may be used to recognize road signs such as posted speed limit signs. One or more microphones 306 may be placed inside and/or outside the cabin to record audio sounds. One or more laser and/or camera based lane tracking sensor(s) 308 may be positioned in the front and/or at the back of the vehicle to track drifting of the vehicle in lane. In one example, a video camera is mounted in the overhead console above the mirror to track the lane markings on the roadway. The captured video images may be processed using one or more processors to determine whether the vehicle has departed from its proper lane and by how much. One or more accelerometers 310 may be placed onboard the vehicle to monitor acceleration along one or more vehicle axis. The axes of vehicle acceleration may include the longitudinal vehicle axis (i.e., the axis substantially in the direction of the vehicle's principal motion), traverse (lateral) vehicle axis (i.e., the substantially horizontal axis substantially orthogonal to the vehicle's principle motion), and the vertical vehicle axis (i.e., the axis orthogonal to both the longitudinal vehicle axis and the traverse vehicle axis). Accelerometer 310 may be a built-in accelerometer put in place by the vehicle manufacture or may be an add-on accelerometer added on post manufacture. Gyroscope 312 may be placed on board the vehicle to detect angular orientation and rate of vehicle rotation (e.g., vehicle rotational dynamics). The rotation is typically measured in reference to one of three axes: yaw, pitch and roll. Moisture sensor 314 may be mounted on the outside of the vehicle to detect environmental moisture level, which provides an indication whether it is raining on the road. Temperature sensor 316 may be mounted on the outside of the vehicle to detect environmental temperature, which provides information as to how cold the outside environment is and whether it is below freezing and by how much. In addition, onboard computer 104 may also have the capability to access information detected by one or more vehicle sensors built in the vehicle by the manufacture via a vehicle bus interface such as OBD 318. For example, via OBD 318, onboard computer 104 can access cabin equipment operation sensor 319, manufacturer built-in speedometer 320 for detecting vehicle speed, anti-lock brake system speed sensor 322 for detecting the rate at which the vehicle wheels are moving and whether the anti-locking brake has been engaged, gas pedal position sensor 324 and brake pedal position sensor 326 for detecting the gas pedal and brake pedal depression degrees and profiles, engine temperature sensor 327 for sensing engine temperature, gear position sensor 328 for sensing gear position/selection, engine rotation speed sensor 330 for sensing the engine rotation speed, and engine exhaust sensor 332 for sensing composition and temperature of engine exhaust. The onboard vehicle sensors are not limited by the examples provided here. Other vehicle sensors may also be included, such as shock sensor, various cabin equipment operation sensors that can be accessed through the vehicle bus that provide information regarding operation of windshield wipers, state of lights (headlights on/off, fog lights on/off, turn signal lights left/right/off, etc.), operation of equipment within the vehicle such as radios, cellular phones, DVD players, the volume at which audio equipment is operated, the identity of the driver based on the entry of an identification number, seat settings, weight, status of seat belts, number of passengers.

Figure 4:
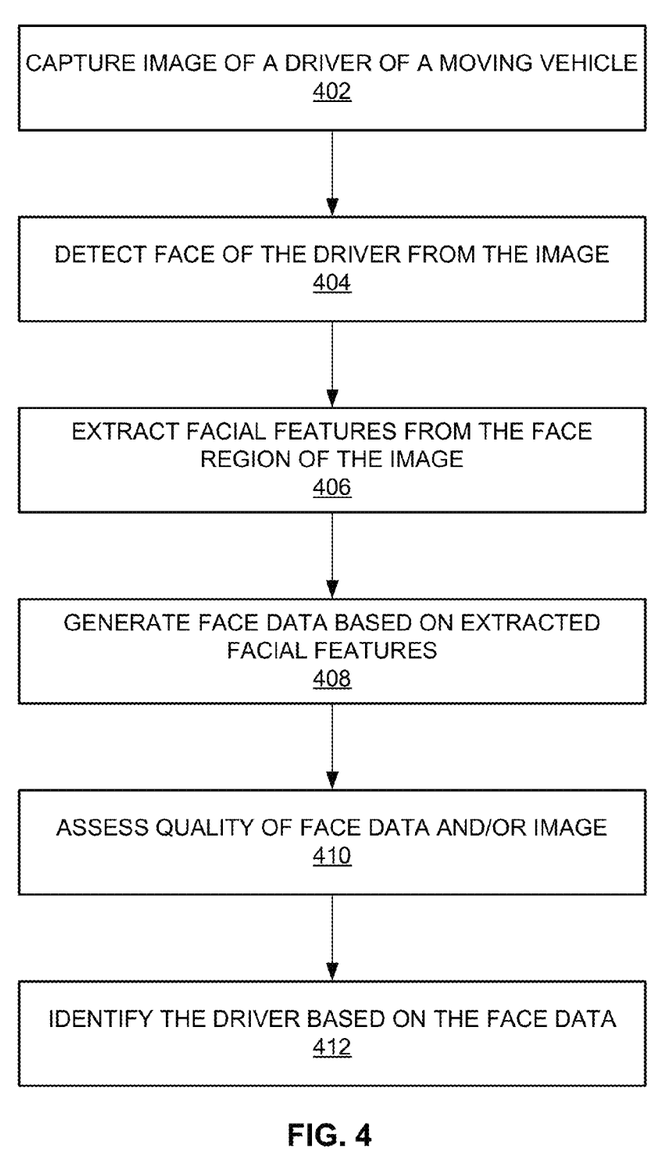
FIG. 4 is a flow diagram illustrating an embodiment of a process for identifying a driver.

FIG. 4 is a flow diagram illustrating an embodiment of a process for identifying a driver. In some embodiments, the process is performed by an onboard computer of the moving vehicle and/or a remote server. In the example shown, in 402, an image of a driver of a moving vehicle is captured. In some embodiments, capturing the image of the drive involves capturing an image of an expected location of the driver in the vehicle. In various embodiments, an image capturing device such as a video camera or a still camera is positioned onboard the vehicle in such a way that the image capturing device having its view focused on an expected driver position can be used to capture an image of the driver. In one example, the image capturing device is placed on the front dashboard of the vehicle. In various embodiments, the image captured is a 2D image. In various embodiments, a 3D image is captured. In various embodiments, the position of the image capturing device may be such that it has more or less the frontal view of the face of the driver. In various embodiments, although a perfect frontal view is preferred, it may not always be possible to be obtain due to various constraints placed on the position of the camera, a view of the face turned slightly to one side or tilted up or down to a certain degree may be tolerated. In various embodiments, the image capturing device is configured to capture an image of the driver periodically (e.g., every 30 seconds) during the operation of the moving vehicle. For example, from the moment the engine is detected to be on to the moment the engine is detected to be off, the image capturing device captures an image of the driver every minute. In various embodiments, the image is time stamped to allow it to be correlated to other sensor data of the moving vehicle, or other vehicles (e.g. in a fleet), on a common time scale.

In 404, the face of the driver is detected in the image. Various face detection and/or location algorithms can be used to detect the presence and/or location of the driver's face within the image. For example, the detection algorithm can be based on a face template, on a deformable feature template, on a skin color model, and/or on a neural network. In various embodiments, the image may be divided into subspaces and each subspace is run through an algorithm to detect whether a face is located within the subspace. In various embodiments, the captured image can be converted to luminance data, hue data, and chroma data for processing by the face detection algorithm. In a face template based approach, a face template is applied to the captured image based on luminance data, the face is detected if the correlation value between the face template and the captured image is sufficiently high. In a skin-color based approach, a skin-colored area is recognized based on the hue data, and the face is detected based on a change in luminance in the skin-color area. In a skin-color and facial feature based approach, skin-colored area is detected based on hue data, facial features such as eyes and mouth are detected by applying deformable feature templates to the captured image, and the face is detected based on the presence of these facial features in the skin-colored area. In a neural network based approach, a neural network based classifier can be trained using positive face examples and non-face examples, and then the classifier is applied to the captured image to detect the presence of the face. In some embodiments, the location of the driver's face is a direct output of the detection algorithm. For example, in the well-known Viola-Jones method for robust face detection (Viola and Jones, 2004), a rectangular "sub-window" is moved about the image in an overlapping fashion, and a set of simple features is computed at each position. These features provide input to an optimized probabilistic model which determines whether or not the sub-window contains a face of an expected size. Alternatively, in some embodiments, the location of the driver's face is found separately through a subsequent operation or operations.

In 406, facial features are extracted from the face region of the image. In some embodiments, the image is transformed prior to facial feature extraction. For example, the image is normalized over size, color, contrast, and hue, luminance, pose (e.g., tilt, turn, etc.) prior to facial feature extraction. In some embodiments, other transformations, such as geometric, lighting, and/or color adjustments, are applied prior to facial feature extraction Example facial features include measurements derived from the subset of the image containing the mouth, eyes, nose, eyebrows, and chin. Various approaches can be used to extract facial features, for example, (1) a luminance, chrominance, facial geometry and symmetry approach, (2) a template matching based approach, and (3) a neural network based approach. In general, two types of information are commonly utilized by these techniques. One is the image appearance of the facial features, which is referred as texture information, and the other is the spatial relationship among different facial features. For example, in a luminance, chrominance, facial geometry and symmetry based approach, the mouth feature is identified based on the redness property of image pixels. Eye features are identified based on the relative position of the mouth by searching for regions which satisfy some statistical, geometrical and structural properties of eyes in a face image. A symmetry transformation is applied to the skin area to find darker rounded regions that could be eyes and horizontal features that could be a mouth. A simple vertical edge detection can yield the locus of the nose. In a feature template based approach, feature templates can be applied to a captured face region of the image; facial features are detected when the correlation values between the feature templates and the captured image are high. In a neural network based method, a neural network is trained individually as a feature detector for each facial feature, and facial features are then located by searching the face image via the trained facial feature detectors.

In 408, face data are generated based on the extracted facial features. The face data are metadata derived from facial image of the driver to identify the distinctive features. In various embodiments, the face data may include coordinate data indicating respective locations of a plurality of facial features. In various embodiments, the face data may include geometric relationships (e.g., distances, angles) among the plurality of facial features.

In 410, the quality of the face data and/or the image is assessed. In various embodiments, a confidence model for face data is built by training with sample face data and the corresponding human rated face data quality scores or confidence index. The confidence model is used to calculate a confidence score that reflects the suitability of the calculated face data for identifying the driver. The quality of the face score is deemed acceptable if it is above a predefined threshold value or unacceptable if it is below a predefined threshold value.

In 412, face data are used to identify the driver. In various embodiments, the face data are compared with previously-collected face data of identified drivers. If a similarity score between the face data of the target driver and that of an identified driver is sufficiently high, the driver is identified. In various embodiments, the face data are applied to a face model. In various embodiments, the face model comprises a neural network based model built by training with face data of drivers and/or non-drivers. The driver can be identified using the neural network model.

In some embodiments, face data is continuously collected from one or more vehicles, and added to a database. Driver identification is performed using a process in which multiple sets of face data are determined to belong to the same driver, and one or more of these sets are then associated with one or more external driver identification signals (e.g., an identification of a driver by a badge, a supervisor, a log, etc.). In some embodiments, multiple sets of face data are determined to belong to the same driver through one or more of the following mechanisms: (1) multiple sets of face data are collected during a time interval in which a vehicle can reliably be assumed to be operated continuously by one person; (2) a human reviews images associated with multiple face data sets and determines that all the faces represent the same driver; (3) the methods to be used for automatic face identification are used to determine that multiple sets of face data are from the same driver. In various embodiments, these operations may be performed either by the onboard computer or on a remote server. By grouping multiple sets of face data from the same driver, a single driver identification signal can associate the entire group with a specific driver, e.g. face data collected over the period of one month among several shared vehicles in a fleet can be associated with one driver based on one driver identification signal. Examples of external driver identification signals include: (1) an RFID unique identifier from a card issued to a specific driver; (2) a supervisor confirms the identity of a driver by viewing a still image or video clip uploaded from the vehicle; (3) a driver dispatch log contains the driving schedule for a driver, and the system automatically associates the identity with one or more collected face data sets.

In various embodiments, the quality (e.g., confidence index) of the face data is determined and the face data are used to identify the driver only if the quality of the face data meet one or more predefined criteria (e.g., have a confidence value higher than a threshold). For example, a confidence index, or a set of confidence indices, of the face data may be calculated based on a model that correlates with a human operator's review of the quality of the face data (e.g., classifying the face data as having low, medium, and high quality). In various embodiments, the quality of the face data is an output of the face detection and/or face feature extraction algorithm. For example, if a Viola-Jones face detection procedure is employed, the confidence index may be a function of the number of overlapping boxes reporting a positive detection. If the detection model is probabilistic (i.e., it outputs an estimate of the probability that an image contains a face), then that probability may be used as a measure of confidence.

In various embodiments, using the face data to identify the driver includes transmitting the face data to a remote server via for example a wireless communications link for driver identification, authentication, and/or registration. In various embodiments, the face data are transmitted to the remote server only if the quality of the face data is determined to be sufficient, such as meeting one or more predefined criteria (e.g., having a quality or confidence value above a threshold). In various embodiments, the face data are associated (e.g., by attaching the same header) to driving data captured around or at the time the image from which the face data are derived is captured.

Figure 5:
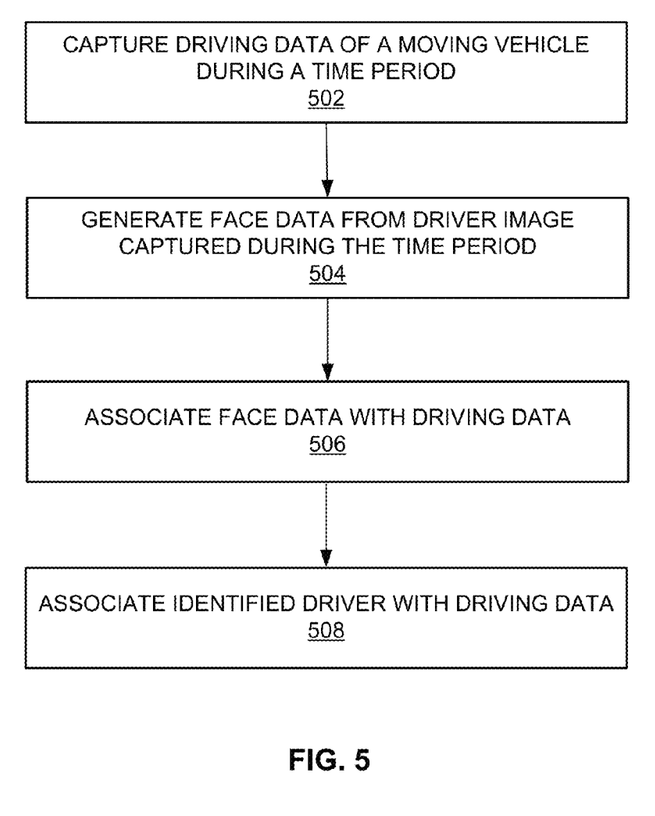
FIG. 5 is a flow diagram illustrating an embodiment of a process for associating face data and driver with driving data.

FIG. 5 is a flow diagram illustrating an embodiment of a process for associating face data and driver with driving data. In various embodiments, the process may be performed by an onboard computing device placed onboard the moving vehicle and/or a remote server. In the example shown, in 502, driving data of a moving vehicle are captured during a time period. In various embodiments, the driving data, reflecting a driver behavior, may include image/audio/video data, sensor data indicating vehicle motion, vehicle operation state, and/or driving environment data indicating the driving environment such as road condition, weather, and traffic condition. In various embodiments, the driving data include driving event data of the moving vehicle. In 504, face data are generated from driver image data captured during the time period. For example, a face is extracted from the image using template matching, color matching, feature matching, and a set of face data is derived from the extracted face. In 506, the face data are associated with the driving data. For example, a header or a footer or other metadata are attached to the face data and the driving data indicating that the face data and driving data are associated with each other. In various embodiments, the image, the face data, and the driving data are correlated using a common time scale. In some embodiments, the image, the face data, and the driving data are time stamped. In various embodiments, correlating the face data with the driving data includes assigning the image and the face data to the driving data. In 508, the identified driver is associated with driving data. For example, the face data are used to identify the driver, and the identified driver is associated with driving data (e.g., driving event data). The driving data are then used to evaluate the performance of the identified driver. In some embodiments, the captured driver image and the corresponding face data are used to positively identify the driver and the operation of the vehicle by the driver at the time the driving data are captured.

Figure 6:
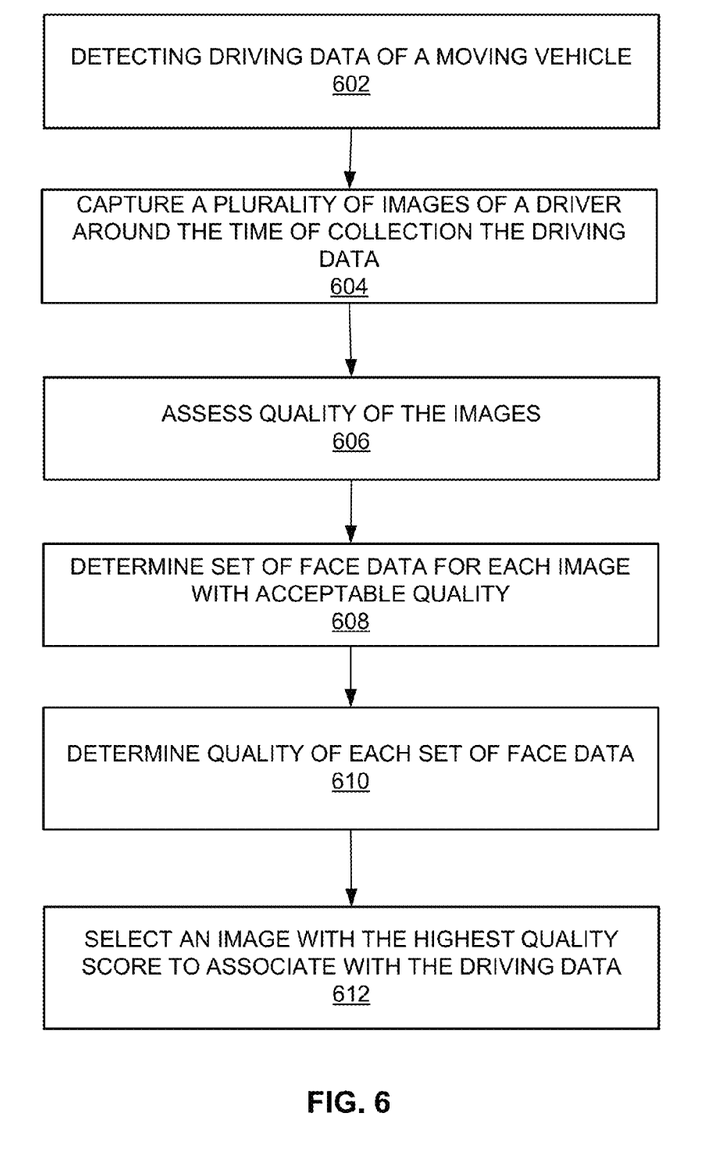
FIG. 6 is a flow diagram illustrating an embodiment of a process for selecting the best face data for driver identification.

FIG. 6 is a flow diagram illustrating an embodiment of a process for selecting the best face data for driver identification. In various embodiments, the process can be performed by an onboard computing device and/or a remote server. In the example shown, in 602, driving data of a moving vehicle are detected. For example, driving data are detected using one or more sensors on a vehicle (e.g., a truck, a semi, a van, a car, etc.). In various embodiments, the driving data include sensor readings, image data indicating driver behavior during vehicle operation, vehicle operation state information, and driving environment information such as road conditions, weather conditions and traffic conditions, or any other appropriate driving data. In 604, a plurality of images of the driver of the moving vehicle is captured around or at the time of the driving data collection. In various embodiments, the image of the driver is captured periodically (e.g., every minute) and/or upon a triggering event. In 606, images are assessed for quality. For example, a quality score is determined for each image. For example, various factors affect the quality of captured image for driver identification: 1) the lighting and its effect on being able to distinguish facial features; 2) the driver's head position and its effect on being able to discern a frontal view of the driver; and 3) motion of the driver (i.e., that blurs the image). The images with acceptable quality scores (e.g., where the quality score is above a threshold) are used for face data generation, driver identification, registration, and/or transmission to a remote server. In 608, a set of face data are determined for each image with acceptable quality. In some embodiments, the acceptable quality of the image is determined in 606. For example, face data are determined by 1) locating the face on each of the captured images, 2) extracting facial features from the images, and 3) calculating geometric relationships among the various facial features (e.g., coordinates distances and angles). In 610, quality of each set of face data is determined. For example, quality of face data is determined by calculating a confidence score using a confidence model, and the high quality face data are retained (e.g., stored). The confidence model indicates the degree of confidence that the face data are likely to support correct driver identification. The model output is trained using face data and corresponding human confirmation of correct identification. In some embodiments, face data are transferred to a remote server based at least in part on a quality score for the face data (e.g., a confidence level above a threshold). In 612, an image with the highest quality score is selected to be associated with driving data. For example, the quality score is used to rank the face data and the image associated with the highest score is associated with the driving data. In some embodiments, the image is associated with the entire driving session (e.g., the period of time in which the vehicle is in an operational state). In some embodiments, a plurality of sets of face data and corresponding images is selected—for example, by choosing the top N sets with their corresponding images. These N sets of face data and corresponding N images are then associated with the driving session (e.g., as being associated with a time period).

In some embodiments, the quality of a face data is determined by comparing a number of face data sets to each other; a face data set that is not similar in nature to the others is given a low quality rating. In some embodiments, determining a similarity of a face image or a face data set is done as a preprocessing step prior to any other processing or qualification of a face image or face data set based on other quality metrics.

Figure 7:
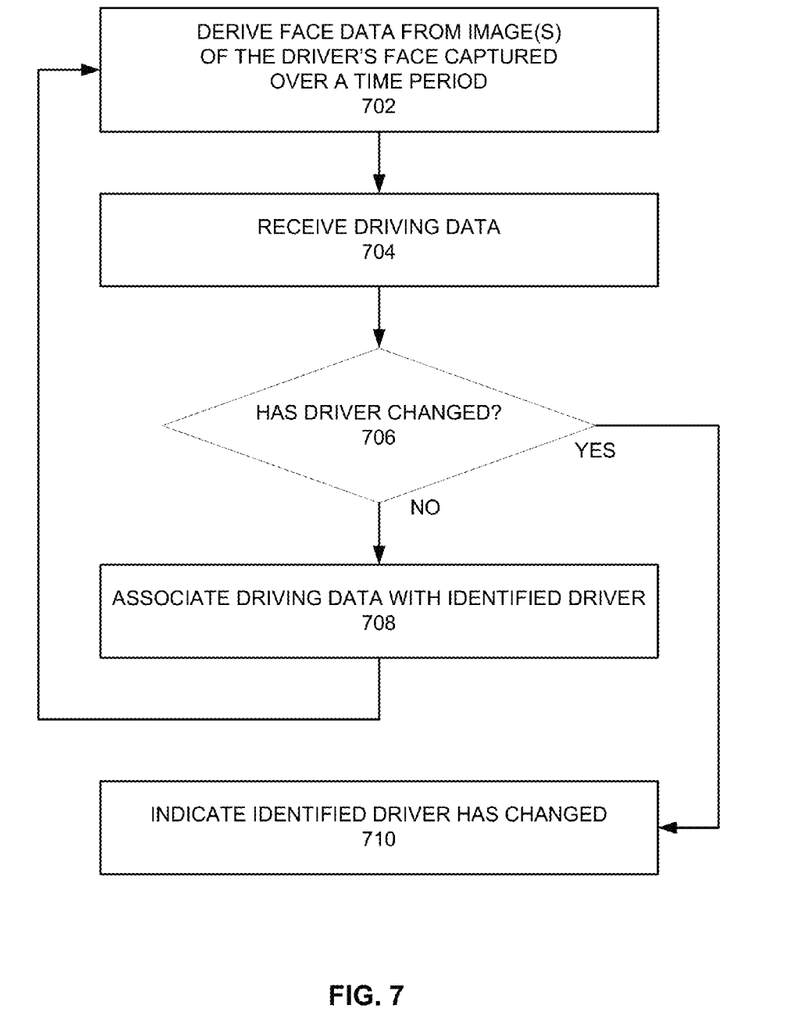
FIG. 7 is a flow diagram illustrating an embodiment of a process for making associations between driving data and face data captured at different times.

FIG. 7 is a flow diagram illustrating an embodiment of a process for making associations between driving data and face data captured at different times. In various embodiments, this process can be performed by an onboard computing device and/or a remote server. In the example shown, in 702, face data are derived from one or more images of the driver's face captured over a time period. In some embodiments, face data are used to identify a driver. In 704, driving data is received. For example, data associated with a driving event, data used to evaluate driving performance, data used to evaluate fuel efficiency performance, vehicle performance data, etc. In 706, it is determined whether the driver has changed. For example, driving data or face data is used to determine whether or not the driver has changed: images show a driver being different or not; speed data indicates that the vehicle has not slowed enough to allow a driver change; weight sensor data indicates that the driver has the same weight at different times, etc. In the event that it has been determined that the driver has not changed, in 708 the driving data is associated with identified driver. In some embodiments, a driver identified previously is associated with the driving data taken at a later time (e.g., driver identified using an RFID, a driver log, a face identification, etc.). For example, driving data is associated with a driver identifier or identification number by storing the identifier or identification number along with the driving data. In some embodiments, the driving data comprise vehicle sensor data. In the event that it has been determined that the driver has changed, in 710 it is indicated that the identified driver has changed.

In some embodiments, face data are derived from one or more images of the driver's face captured over a certain time period. Additionally, driving data have been captured over another time period, potentially not overlapping the time period during which the face data were captured. The decision system calculates a time period during which there is a low probability that the driver of the vehicle has changed. During this time period, all face data and driving data represent one driver. As a consequence, data transmission bandwidth may be reduced by transmitting only a subset of the data in the time period, saving cost without reducing the accuracy of the process. In various embodiments, data from the time period, as described above, are consolidated. In the time period, face data from one or more driver images may be used to establish this match. In some embodiments, a similarity score is calculated between the face data collected during the time period. In some embodiments, if the similarity score is above a threshold, the data are assumed to have been collected while the same person was driving the vehicle. For example, the similarity score is above a predefined or empirically defined threshold. Alternatively, the score being below a possibly different threshold could indicate that the driver is likely to have changed. In some embodiments, this association of data in a time period is recorded by adding metadata in a header, a footer, or any other appropriate metadata storage.

Figure 8:
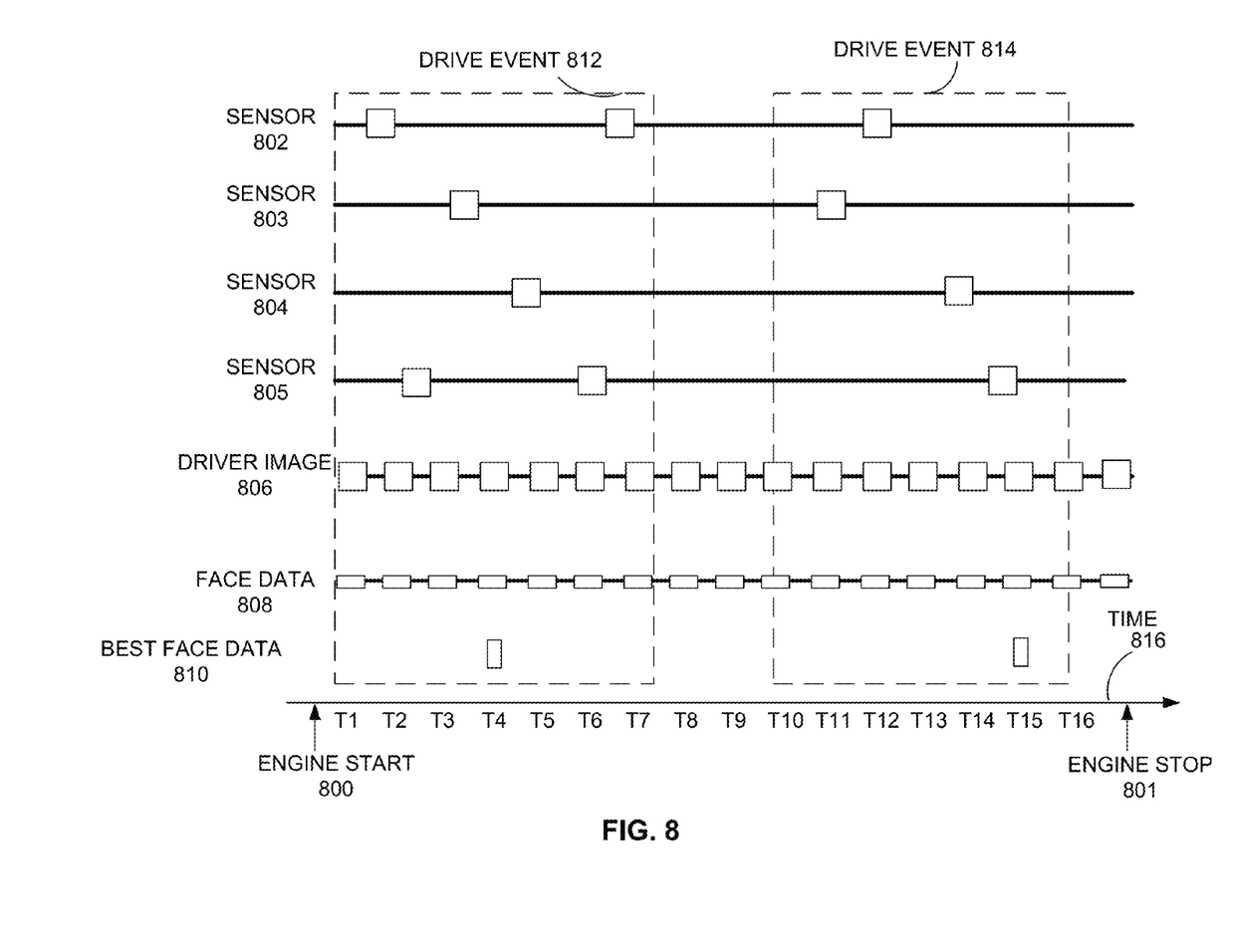
FIG. 8 is a diagram illustrating an embodiment of capturing and/or generating driving data, driver images and face data.

FIG. 8 is a diagram illustrating an embodiment of capturing and/or generating driving data, driver images, and face data. In the example shown, between engine start 800 and engine stop 801 (as shown on time 816 axis), sensor 802, sensor 803, sensor 804, sensor 805 capture driving data. The driving data may include vehicle operation state data such as vehicle speed, linear acceleration, angular acceleration, driving condition data such as weather condition, road condition and traffic condition, and driver behavior data such as throttle position, brake position, steering wheel position, and/or use of cabin equipment. Driving event 812 and driving event 814 are determined based at least in part on driving data. Driving event 812 is shown to correspond to time T1 through time T7. Driving event 814 is shown to correspond to time T10 through time T16. Between engine start 800 and engine stop 801, camera 806 captures images (as designated by rectangles along the line). Face data 808 are generated from the captured images In some embodiments, face data is extracted from a full image and a cropped image is used for confirmation of driver identity by a human. The best face data 810 are selected based on quality scores. In various embodiments, best face data are selected from an image taken recently, an image taken from a previously stored image, one of a top N images stored, or any other appropriate image. Best face data 810 are used for driver identification and/or registration or transmitted to a remote server for driver identification and/or registration. In some embodiments, the driver associated with driving event 812 is also associated with driving event 814, if best face data 810 are similar to one another.

Figure 9:
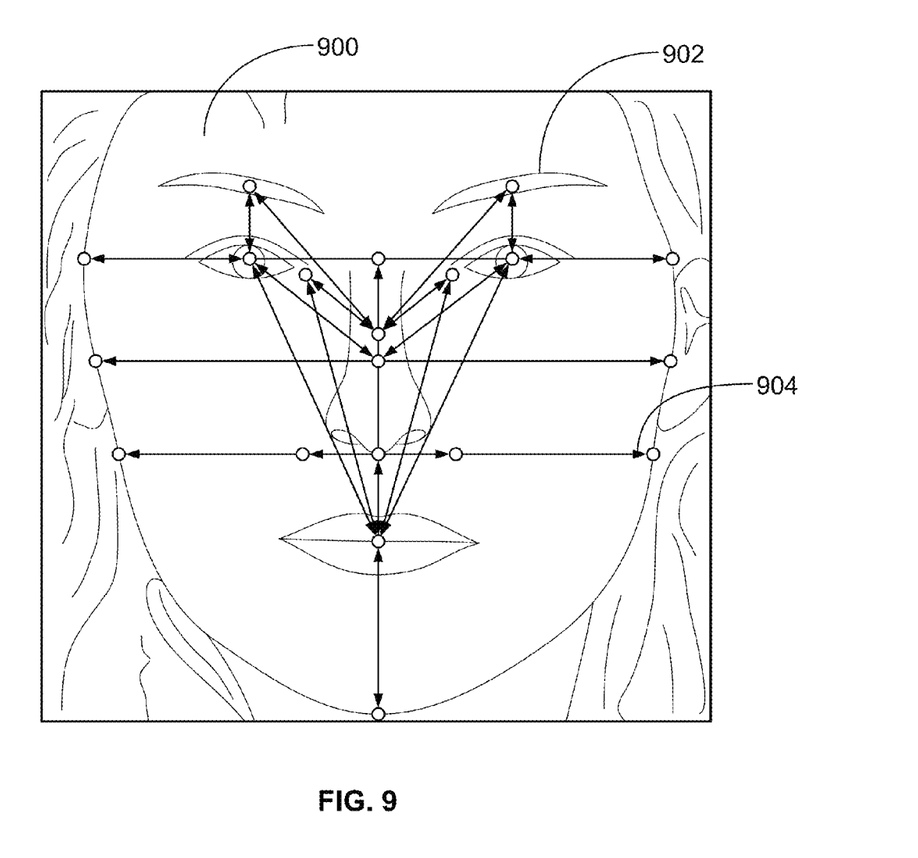
FIG. 9 is a diagram illustrating an embodiment of the facial features.

FIG. 9 is a diagram illustrating an embodiment of the facial features. In the example shown, image 900 is analyzed for facial features—for example, eyebrow 902, eyes, nose, mouth, cheeks, chin, etc. The facial features are used to determine a set of face data (e.g., data corresponding to point 904). In some embodiments, facial feature coordinates and relations between them (e.g., geometric relations) comprise face data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for identifying a driver, comprising:
    an image capturing device for capturing a first image during vehicle operation and of an expected driver location;
    a processor configured to:
        detect a face of a driver in the first image;
        determine a quality score for the first image;
        in the event the quality score of the first image is determined to exceed a pre-determined threshold, determine a set of face data from the first image;
        determine a confidence index for the determined the set of face data, wherein the confidence index indicates a degree of confidence that the set of face data is likely to support correct driver identification;
        in the event the confidence index meets a confidence threshold, identify the driver based at least in part on the set of face data; and
    a memory coupled to the processor and configured to provide the processor with instructions.

2. The system of claim 1, wherein identifying the driver comprises comparing a set of face data with a set or sets of known driver face data.

3. The system of claim 1, wherein identifying the driver comprises inputting the set of face data into a face model.

4. The system of claim 1, further comprising:
    one or more onboard vehicle sensors for detecting a driving data, wherein the driving data is associated with a time period of vehicle operation; and
    wherein the processor is further configured to associate the driver with the driving data.

5. The system of claim 1,
    wherein the image capturing device captures another image during an other time period of vehicle operation;
    wherein the processor is further configured to:
        locate an other face of an other driver within the other image;
        determine an other set of face data from the other image; and
        calculate a similarity score between the set of face data and the other set of face data.

6. The system of claim 5, wherein the processor is further configured to:
    in the event that the similarity score meets a similarity criteria, indicate that the driver in the time period and the other driver in the other time period are the same driver.

7. The system of claim 4, wherein the driving data comprise a driving event.

8. The system of claim 4, wherein the driving data comprise operation state data.

9. The system of claim 8, wherein the operation state data comprise one or more of the following: vehicle speed data, vehicle acceleration data, vehicle deceleration data, and vehicle rotational dynamics data.

10. The system of claim 4, wherein the driving data comprise geo-location data.

11. The system of claim 1, further comprising a communication interface for transmitting the set of face data to a remoter server.

12. The system of claim 11, wherein transmitting uses wireless communications link.

13. The system of claim 1, wherein in the event that the confidence index meets a confidence threshold, transmitting the set of face data to a remote server.

14. The system of claim 1, wherein the set of face data is based at least in part on one or more of the following facial features: eye, eyebrow, nose, and mouth identified in the image.

15. The system of claim 14, wherein determining the set of face data comprises determining one or more geometric relationships among the one or more facial features.

16. The system of claim 1, wherein the image capture device is configured to capture a plurality of images during vehicle operation at a time interval of an expected driver location, wherein the processor is further configured to:
    determine a quality score for the plurality of images,
    in the event the quality score of the plurality of images exceed a pre-determined threshold, extract a set of face data from each image that has a quality score that exceeds pre-determined threshold,
    determine a confidence index for each set of extracted face data, and
    rank the extracted face data based at least in part on corresponding confidence index.

17. The system of claim 16, wherein the driver is identified based at least in part on the set of face data determined to have a highest confidence index.

18. The system of claim 16, wherein the set of face data determined to have a highest confidence index is transmitted to a remote server.

19. A method for identifying a driver, comprising:
    capturing a first image during vehicle operation of an expected driver location;
    detecting a face of a driver in the first image;
    determining a quality score for the first image;
    in the event the quality score of the first image is determined to exceed a pre-determined threshold, determining a set of face data from the first image;
    determining a confidence index for the determined the set of face data, wherein the confidence index indicates a degree of confidence that the set of face data is likely to support correct driver identification; and
    in the event the confidence index meets a confidence threshold, identifying the driver based at least in part on the set of face data.

20. A computer program product for identifying driver, the computer program product being embodied in a non-transitory computer readable storage medium and comprising computer instructions for:
    capturing a first image during vehicle operation of an expected driver location;
    detecting a face of a driver in the first image;
    determining a quality score for the first image;
    in the event the quality score of the first image is determined to exceed a pre-determined threshold, determining a set of face data from the first image;
    determining a confidence index for the determined the set of face data, wherein the confidence index indicates a degree of confidence that the set of face data is likely to support correct driver identification; and
    in the event the confidence index meets a confidence threshold, identifying the driver based at least in part on the set of face data.

* * * * *